US008865786B2

(12) United States Patent
Yan et al.

(10) Patent No.: US 8,865,786 B2
(45) Date of Patent: Oct. 21, 2014

(54) ANTIREFLECTIVE COATING COMPOSITIONS

(75) Inventors: Yongan Yan, Thousand Oaks, CA (US); Satyabrata Raychaudhuri, Thousand Oaks, CA (US); Matthew Emilio Coda, Menlo Park, CA (US)

(73) Assignee: Yazaki Corporation (JP)

( * ) Notice: Subject to any disclaimer, the term of this patent is extended or adjusted under 35 U.S.C. 154(b) by 497 days.

(21) Appl. No.: 12/488,309

(22) Filed: Jun. 19, 2009
(Under 37 CFR 1.47)

(65) Prior Publication Data

US 2010/0168264 A1 Jul. 1, 2010

Related U.S. Application Data

(62) Division of application No. 11/432,685, filed on May 10, 2006.

(60) Provisional application No. 60/701,545, filed on Jul. 22, 2005, provisional application No. 60/680,079, filed on May 11, 2005.

(51) Int. Cl.

| | |
|---|---|
| ***C08K 3/36*** | (2006.01) |
| ***C09D 7/12*** | (2006.01) |
| ***C09D 151/10*** | (2006.01) |
| ***C09D 5/00*** | (2006.01) |
| ***G02B 1/11*** | (2006.01) |
| ***C08F 290/06*** | (2006.01) |
| ***C08F 283/10*** | (2006.01) |
| ***C09D 133/06*** | (2006.01) |

(52) U.S. Cl.
CPC .............. *G02B 1/113* (2013.01); *C09D 7/1225* (2013.01); *C09D 151/10* (2013.01); *C09D 5/006* (2013.01); *C08F 290/064* (2013.01); *C08F 283/10* (2013.01); *C09D 133/06* (2013.01); *C08K 3/36* (2013.01); *C08F 290/06* (2013.01)
USPC .................................... 522/8; 522/83; 522/39

(58) Field of Classification Search
None
See application file for complete search history.

(56) References Cited

U.S. PATENT DOCUMENTS

| | | | | |
|---|---|---|---|---|
| 4,404,075 | A * | 9/1983 | Ikeda et al. | 522/40 |
| 4,478,876 | A | 10/1984 | Chung | |
| 5,493,483 | A | 2/1996 | Lake | |
| 5,856,018 | A | 1/1999 | Chen et al. | |
| 6,001,163 | A | 12/1999 | Havey et al. | |
| RE37,183 | E | 5/2001 | Kawamura et al. | |
| 6,335,380 | B1 | 1/2002 | Wilhelm et al. | |
| 6,395,331 | B1 | 5/2002 | Yan et al. | |
| 7,278,728 | B2 * | 10/2007 | Desie et al. | 347/100 |
| 2003/0073779 | A1 * | 4/2003 | Tamori et al. | 524/588 |
| 2004/0102566 | A1 | 5/2004 | Forray et al. | |

FOREIGN PATENT DOCUMENTS

| | | | | |
|---|---|---|---|---|
| EP | 0505737 | | 9/1992 | |
| EP | 2003292896 | | 2/2003 | |
| JP | 2000-239309 | * | 5/2000 | C08F 2/50 |
| JP | 2004212619 | | 7/2004 | |
| JP | 2004352951 | | 12/2004 | |
| WO | WO 00/06622 | | 2/2000 | |
| WO | WO2004/079407 | * | 9/2004 | G02B 1/11 |

OTHER PUBLICATIONS

Chen, Dinguo, "Antireflection Coatings Made by Sol-Gel Processess," Solar Energy Materials and Solar Cells, vol. 68, 2001, pp. 313-336.

* cited by examiner

*Primary Examiner* — Yun Qian
(74) *Attorney, Agent, or Firm* — Sheppard, Mullin, Richter & Hampton LLP

(57) ABSTRACT

Coating compositions, and methods for depositing them on the surface of an article to produce an antireflection coating, are disclosed. In one embodiment, the coating composition includes a (meth)acrylate-functional silicon alkoxide, silica particles, a (meth)acrylate monomer, an epoxy (meth)acrylate oligomer, a photoinitiator, a solvent, an acid, and water. The relative amounts of these constituents are controlled such that, when the coating composition is deposited onto the surface of an article and cured, it has a refractive index less than about 1.60 at a wavelength of 510 nm. In another embodiment, the coating composition includes an organo-metallic compound other than an organo-metallic compound of silicon, an epoxy-functional silicon alkoxide, a non-epoxy-functional silicon alkoxide, a curing agent compatible with epoxy-functional molecules, a solvent, an inorganic acid, and water. The relative amounts of these constituents are controlled such that, when the coating composition is deposited onto the surface of an article and cured, it has a refractive index greater than about 1.70 at a wavelength of 510 nm. The coating compositions are deposited in a process that produces an antireflection coating in less than 90 minutes of processing time.

13 Claims, 6 Drawing Sheets

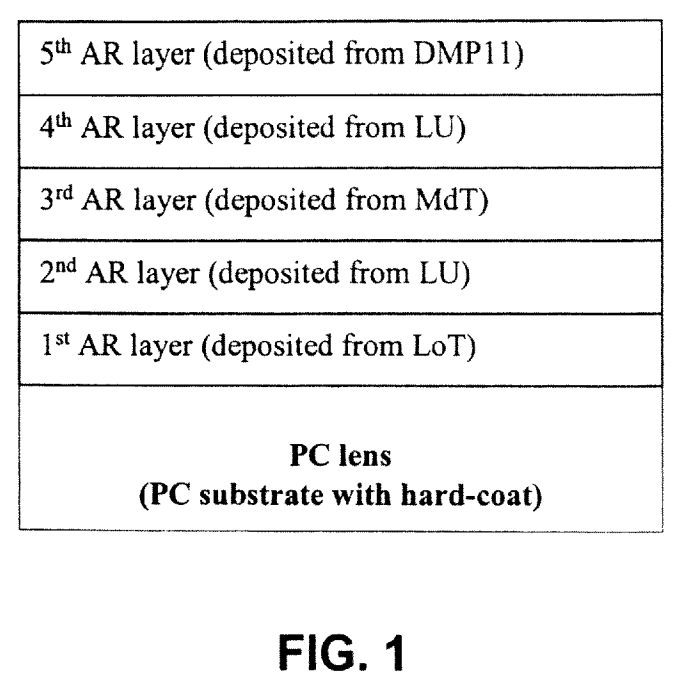

5th AR layer (deposited from DMP11)

4th AR layer (deposited from LU)

3rd AR layer (deposited from MdT)

2nd AR layer (deposited from LU)

1st AR layer (deposited from LoT)

PC lens
(PC substrate with hard-coat)

FIG. 1

ANTIREFLECTIVE COATING COMPOSITIONS

CROSS-REFERENCE TO RELATED APPLICATIONS

This is a divisional of co-pending application Ser. No. 11/432,685, which claims priority from U.S. Provisional Patent Application Ser. No. 60/680,079, filed May 11, 2005, and Ser. No. 60/701,545, filed Jul. 22, 2005, which are incorporated herein by reference.

BACKGROUND OF THE INVENTION

This invention relates generally to antireflective coating compositions and to methods for depositing such compositions onto articles, especially transparent articles.

Antireflection coatings on transparent articles reduce the reflectance of visible light from the articles and enhance the transmission of such light into, or through, the articles. When the articles are used as cover plates for display instruments, these coatings enhance the brightness, contrast, and readability of the displayed information, for a variety of lighting conditions. Optical articles such as ophthalmic lenses frequently are coated with antireflective coatings to decrease the level of reflected light and thereby increase visibility and minimize eye fatigue.

Although various antireflection coatings have been generally effective in providing reduced reflectivity over the visible spectrum, the coatings are not considered to have been entirely satisfactory for use in many applications. For example, some of the coatings are highly susceptible to mechanical damage from abrasion and exhibit poor adhesion to the underlying substrate. Moreover, some of the processes used for depositing such coatings, including electron beam deposition, reactive plasma sputtering, and ion-assisted deposition, are relatively expensive to implement.

It should, therefore, be appreciated that there is a need for improved antireflection coating compositions and for an improved process for depositing such coating compositions onto articles, especially transparent articles, in a variety of sizes and configurations, with reduced expense and with reduced susceptibility to mechanical damage. The present invention fulfills this need and provides further related advantages.

SUMMARY THE INVENTION

The present invention resides in an improved antireflection coating compositions and for an improved process for depositing such coating compositions onto articles, especially transparent articles, in a variety of sizes and configurations, with reduced cost and with reduced susceptibility to mechanical damage.

More particularly, one coating composition in accordance with the invention comprises at least one (meth)acrylate-functional silicon alkoxide, silica particles, at least one (meth)acrylate monomer, at least one epoxy (meth)acrylate oligomer, at least one photoinitiator, at least one solvent, at least one acid, and water. The relative amounts of the constituents of the coating composition are controlled such that, when the coating composition is dispensed onto the surface of an article and cured, it has a refractive index less than about 1.60, or more preferably less than about 1.55, or most preferably less than about 1.50, all at a wavelength of 510 nm.

In more detailed features of this embodiment of the invention, the (meth)acrylate-functional silicon alkoxide is selected from the group consisting of (3-acryloxypropyl)dimethylmethoxysilane, (3-acryloxypropyl)methlyldimethoxysilane, (3-acryloxypropyl)trimethoxysilane, (methacryloxymethyl)dimethylethoxysilane, methacryloxymethyltriethoxysilane, methacryloxymethyltrimethoxysilane, methacryloxypropylmethyldiethoxysilane, methacryloxypropylmethyldimethoxysilane, (3-methacryloxypropyl)triethoxysilane, (3-methacryloxypropyl)trimethoxysilane, and mixtures thereof. Further, the (meth) acrylate monomer is selected from the group consisting of 2(2-ethoxyethoxy) ethyl acrylate, 2-phenoxyethyl acrylate, 2-phenoxyethyl methacrylate, caprolactone acrylate, dicyclopentadienyl methacrylate, tetrahydrofurfuryl acrylate, tetrahydrofurfuryl methacrylate, 1,3-butylene glycol diacrylate, 1,4 butanediol dimethacrylate, diethylene glycol diacrylate, ethoxylated bisphenol A diacrylate, ethoxylated bisphenol A dimethacrylate, ethylene glycol dimethacrylate, ethoxylated trimethylolpropane triacrylate, pentaeryhritol triacrylate, propoxylated glyceryl triacrylate, propoxylated trimethylolpropane triacrylate, trimethylolpropane triacrylate, trimethylolpropane trimethacrylate, tris(2-hydroxy ethyl) isocyanurate triacrylate, and mixtures thereof.

In other more detailed features of this embodiment of the invention, the photoinitiator is selected from the group consisting of 1-hydroxy-cyclohexyl-phenyl-ketone, 2-methyl-1-[4-(methylthio)phenyl]-2-(4-morpholinyl)-1-propanone, and mixtures thereof. Further, the solvent is selected from the group consisting of isopropanol, ethyl acetate, 1-methoxy 2-propanol, and mixtures thereof. The inorganic acid is hydrochloric acid.

In an alternative coating composition in accordance with the invention, the coating composition comprises at least one organo-metallic compound other than an organo-metallic compound of silicon, at least one epoxy-functional silicon alkoxide, at least one non-epoxy-functional silicon alkoxide, at least one curing agent compatible with epoxy-functional molecules, at least one solvent, at least one inorganic acid, and water. The relative amounts of the constituents of this coating composition are controlled such that, when the coating composition is deposited onto the surface of an article and cured, it has a refractive index greater than about 1.70, or more preferably greater than about 1.80, or most preferably greater than about 1.90, all at a wavelength of 510 nm.

In more detailed features of this embodiment of the invention, the organo-metallic compound is selected from the group consisting of organo-metallic compounds represented by formulas $R^1_xM^1(OR^2)_{4-x}$, $R^1_yM^2(OR^2)_{3-y}$, $R^1_zNb(OR^2)_{5-z}$, and mixtures thereof; wherein $M^1$ is a metal selected from the group consisting of Ti, Zr, Ge, and Sn; wherein $M^2$ is a metal selected from the group consisting of Al, In, and Sb; wherein $R^1$ is an organic functional group selected from the group consisting of $C_1$-$C_4$ alkyl, vinyl, allyl, acryloxy, epoxide, and amino groups; wherein $R^2$ is $C_1$-$C_4$ alkyl group; and wherein x is 0, 1, 2, or 3; y is 0, 1, or 2; and z is 0, 1, 2, 3, or 4.

In other, more detailed features of this embodiment of the invention, the epoxy-functional silicon alkoxide is selected from the group consisting of 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl) dimethylethoxysilane, (3-glycidoxypropyl) methyldiethoxysilane, glycidoxypropyl) methyldimethoxysilane, (3-glycidoxypropyl) trimethoxysilane, glycidoxymethyltrimethoxysilane, 3-glycidoxypropyltriethoxysilane, 3-cyanopropyltrimethoxysilane, and mixtures thereof. Further, the non-epoxy-functional silicon alkoxide is represented by a general formula $(OFG)_w$-Si—$(OR^3)_{4-w}$, wherein OFG is an organo-functional group; $OR^3$ is a hydrolyzable alkoxy group; $R^3$ is an alkyl; and w is 0, 1, 2 or 3. Preferably, the silicon alkoxide is selected from the group consisting of tetraethoxysilane, tetramethoxysilane, and mixtures thereof.

In yet other more detailed features of the invention, the curing agent is selected from the group consisting of an anhydride, a carboxylic acid, and mixtures thereof. Preferably, the curing agent is selected from the group consisting of acetic anhydride, acrylic anhydride, cyclic anhydride, hexahydrophthalic anhydride, methacrylic anhydride, propionic anhydride, acetic acid, acrylic acid, formic acid, fumaric acid, itaconic acid, maleic acid, methacrylic acid, propionic acid, methylenesuccinic acid, and mixtures thereof. Further, the solvent is selected from the group consisting of ethanol, 1-methoxy 2-propanol, and mixtures thereof. The inorganic acid preferably is hydrochloric acid.

The process of the invention includes the steps of providing a first coating composition that includes at least one (meth) acrylate-functional silicon alkoxide, silica particles, at least one (meth)acrylate monomer, at least one epoxy (meth)acrylate oligomer, at least one photoinitiator, at least one solvent, at least one acid, and water, and forming an antireflection coating on a surface of an article using the first coating composition. The step of forming includes a step of depositing a first coating layer onto the article's surface, including steps of (1) dispensing the first coating composition onto the surface, and (2) curing the dispensed first coating composition, to produce the first coating layer. Preferably, this first coating layer has a refractive index less than about 1.60, or more preferably less than about 1.55, or most preferably less than about 1.50, all at a wavelength of 510 nm. The step of forming an antireflection coating has a preferred time duration of less than 90 minutes, or more preferably less than 30 minutes, and most preferably less than 10 minutes. The resulting antireflection coating has prescribed optical properties and prescribed adhesion and abrasion resistance properties.

In other more detailed features of the invention, the process further includes a step of providing a second coating composition that includes at least one organo-metallic compound other than an organo-metallic compound of silicon, at least one epoxy-functional silicon alkoxide, at least one non-epoxy-functional silicon alkoxide, at least one curing agent compatible with epoxy-functional molecules, at least one solvent, at least one inorganic acid, and water. The step of forming further includes a step of depositing the second coating composition onto the article's surface, including steps of (1) dispensing the second coating composition onto the surface, and (2) curing the dispensed second coating composition, to produce the second coating layer. Preferably this second coating layer has a refractive index greater than about 1.70, or more preferably greater than about 1.80, or most preferably greater than about 1.90, all at a wavelength of 510 nm.

In one preferred embodiment, the AR coating includes multiple layers, alternating between the second coating layer and the first coating layer. When forming such an AR coating, the step of depositing the second coating layer alternates with the step of depositing the first coating layer, with the former step occurring first, such that the lowest coating layer comprises the second coating composition. In addition, at least one of the alternating steps of depositing the second coating layer and depositing the first coating layer can include a step of heat-treating the dispensed coating composition prior to the step of curing such dispensed coating composition.

Further, the coating process can further include a step of depositing a hard-coat layer onto the surface of the article prior to forming the antireflection coating.

Other features and advantages of the present invention should become apparent from the following description of the preferred embodiments and methods, taken in conjunction with the accompanying drawings, which illustrate, by way of example, the principles of the invention.

BRIEF DESCRIPTION OF THE DRAWINGS

FIG. 1 is a schematic cross-sectional view of a five-layer antireflective (AR) coating deposited onto one surface of a polycarbonate (PC) lens, as described in Example 12, below. The hydrophobic coating layer of that Example is not shown.

DETAILED DESCRIPTION OF THE PREFERRED EMBODIMENTS AND METHODS

Figure 2:
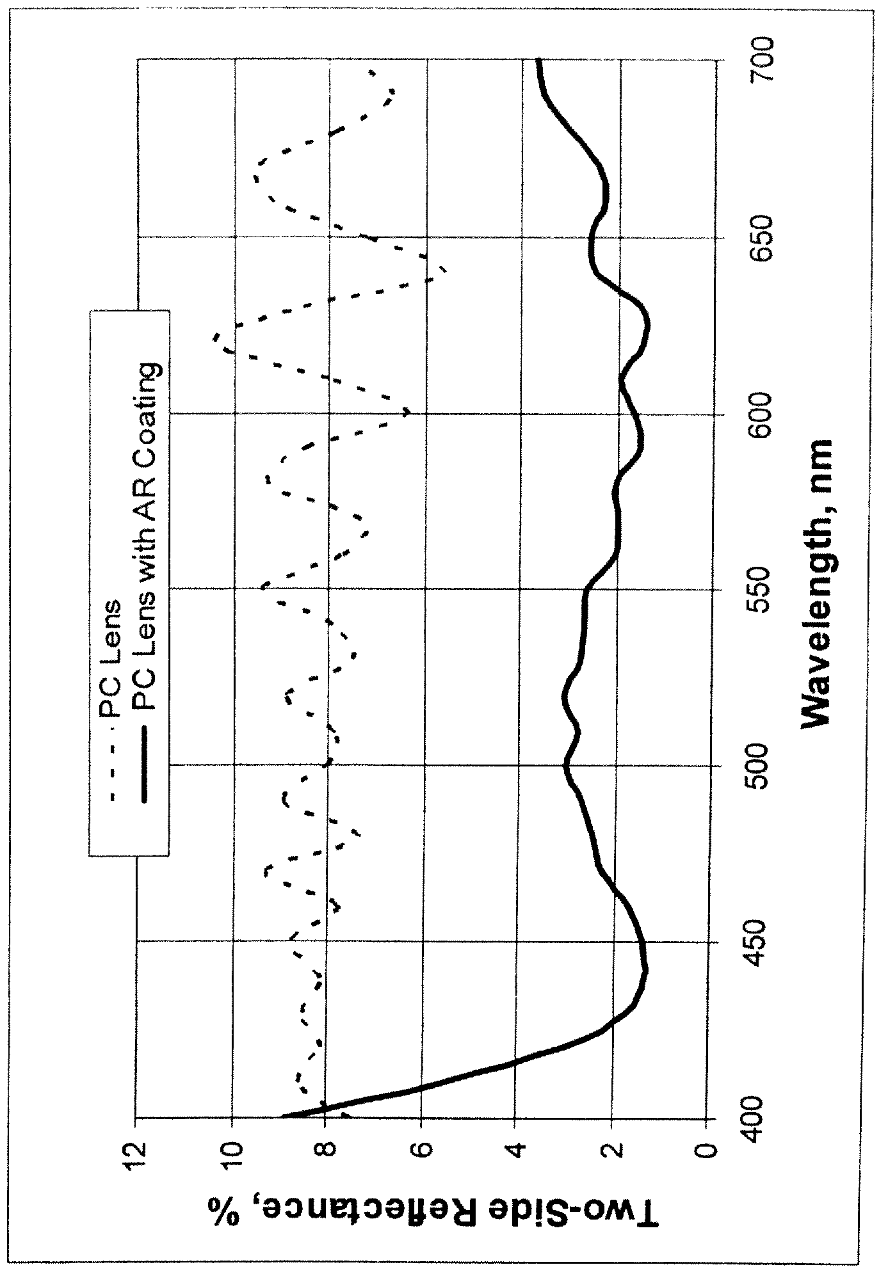
FIG. 2 is a graph depicting the reflectance of a PC lens, with the five-layer AR coating of Example 12 deposited onto both its convex surface and its concave surface, and without such coating, as a function of wavelength.

This invention relates generally to antireflective (AR) coating compositions that can be deposited onto transparent articles within a very short processing time. The invention also relates to processes for depositing such AR coating compositions onto such transparent articles. The AR coatings deposited using these coating compositions and processes have good mechanical properties, i.e., good adherence, good hardness, and improved abrasion resistance.

Transparent optical articles such as lenses, prisms, optical windows, photomask substrates, pellicles used in photomask assemblies, and the like may be coated with the coatings of the invention, to provide antireflective properties. The transparent articles also comprise cover plates of display devices such as field emission displays, liquid crystal displays (LCDs), plasma display panels (PDPs), electroluminescence displays (ELDs), cathode ray tube displays (CRTs), fluorescence tube displays, meters, clocks, and the like, used in the manufacture of televisions, personal digital assistants (PDAs), cellular phones, vehicle dashboards, projection screens, hand-held games, and the like.

The articles being coated may be of any shape, including simple rectangular and flat shapes as well as complicated shapes having curvatures and bends. The articles may comprise polymers, glasses, ceramics, or hybrids of these materials. Polymeric articles may comprise poly(methyl methacrylate) (PMMA), polycarbonate (PC), poly(ethylene terephthalate) (PET), polystyrene, poly(diethylene glycolbis-allyl carbonate) (ADC) or CR-39®, triacetyl cellulose (TAC), poly (ethylene-2,6-naphthalate) (PEN), or the like.

The AR coating is deposited onto at least one surface of such articles using the coating compositions of this invention, which are prepared using a liquid-based process. The deposition of these compositions produces AR coating layers having higher refractive indices (i.e., higher than 1.70, 1.80, or 1.90 at a wavelength of about 510 nm) and lower refractive indices (i.e., lower than 1.60, 1.55, or 1.50 at a wavelength of about 510 nm), each layer having a prescribed thickness in the range of 10 to 200 nm.

The AR coating comprises at least one AR layer. If the AR coating includes just one layer, that layer is deposited using a coating composition having a refractive index lower than that of the article. On the other hand, if the AR coating includes multiple layers, those layers may alternate between a layer having a refractive index higher than 1.70, 1.80, or 1.90, at a wavelength of about 510 nm, and a layer having a refractive index lower than 1.60, 1.55, or 1.50, at that same wavelength of about 510 nm.

Principles of providing coatings having antireflective properties are described in a publication entitled "Antireflection Coatings Made by Sol-Gel Processes," *Solar Energy Materials and Solar Cells*, Volume 68 (2001), pages 313 to 336, by Dinguo Chen. Two basic approaches to achieve low reflection are described. In one approach, the surface of the antireflective layer is roughened by etching, grinding, embossing, or like, or by incorporating particles into the transparent matrix. This provides haze, or diffuse reflection, and thereby reduces the reflection level. Coatings obtained by this approach are commonly referred as antiglare coatings. In the other approach, the refractive indices and thicknesses of a series of coating layers are controlled to provide destructive interference of the light reflected at the interfaces between the successive layers and the article.

Antiglare coatings prepared by etching, grinding, embossing, or like, generally have lower mechanical strength and abrasion resistance than do antiglare coatings prepared by incorporating particles into the coating matrix. The antiglare approach is advantageous, because the reflection levels of such coatings are less dependent on the wavelength of the incident light and because the control of the thicknesses and refractive indices of the coating's layers is relatively less critical.

On the other hand, the destructive interference approach provides clearer coatings, with comparatively lower antireflection levels. However, the reflection level of such coatings is more dependent on the wavelength of the incident light. Although the effect of this wavelength dependence may be decreased by having multiple destructive interference layers, the manufacturing cost of the coating increases with each additional layer. Furthermore, the control of the thicknesses and refractive indices is relatively more critical for the destructive interference type AR coatings.

Thus, both approaches have relative advantages and disadvantages. The choice between the two approaches depends on desired antireflective property level and cost requirements of a specific application. Both approaches, and a combination of the approaches, are within the scope of this invention.

In one embodiment of the invention, the transparent articles may also incorporate a hard-coat. This hard-coat is deposited onto at least one surface of the article, before the AR coating is deposited. The hard-coat layer is incorporated into the coating to provide abrasion resistance not only for the article, but also for the AR coating itself. Deposition of the hard-coat layer is carried out using a suitable liquid hard-coat formulation. In general, there are two types of liquid formulations: thermally curable and radiation-energy-curable, particularly ultraviolet (UV)-curable formulations. Both types of hard-coat formulations are within the scope of this invention. The thermally curable formulations may provide better abrasion resistance than do the UV-curable formulations. However, the UV-curable formulations may be cured at comparatively faster rates, thereby decreasing production costs. The type of hard-coat formulation suitable for this invention may be decided by considering abrasion resistance and production cost requirements of a particular article.

In addition to the abrasion-resistance requirement, the hard-coat layer may have a refractive index closely matching that of the underlying article, to prevent the formation of interference fringes. Further, the thickness of the hard-coat layer may be in the range of 1 to 10 micrometers, or more preferably in the range of 2 to 6 micrometers, to provide the described abrasion resistance. If the thickness is less than 1 micrometer, the hard-coat layer might not provide an abrasion resistance level within the scope of this invention. On the other hand, if the thickness is more than 10 micrometers, the deposition of the hard-coat layer may result in formation of cracks, surface non-uniformities, or the entrapment of bubbles, leading to degradation of the coating's mechanical and optical properties.

The preparation and deposition of a variety of hard-coat formulations providing abrasion resistance and refractive index levels suitable for the AR coatings of this invention are well described in the prior art. A few examples of such hard-coat formulations are described in U.S. Pat. No. 4,478,876 to Chung; U.S. Pat. No. 5,493,583 to Lake; and U.S. Pat. No. 6,001,163 to Havey et al. Such formulations are commercially available from SDC Corporation, of Anaheim, Calif., or Red Spot Corporation, of Evansville, Ind. Commercial UV-curable formulations sold under trademark MP1175UV by SDC Corporation and under the trademark UVB510R6 by Red Spot Corporation, and a commercial thermally curable formulation sold under trademark MP1154D by SDC Corporation, may be used for depositing the hard-coat layer of the present invention. Hard-coat deposition and curing techniques and conditions described in the prior art, as well as in application sheets of the commercial formulations, may be applied to provide the hard-coat layer of this invention.

Before the deposition of the hard-coat layer, the surface of the article may be modified by techniques well described in the prior art. These techniques include corona discharge, chemical etching (particularly using a NaOH or KOH solution), or deposition of a primer layer to increase adhesion of the hard-coat layer to the surface of the article. For this purpose, the transparent article may further incorporate a primer layer deposited onto at least one surface of the article, before the deposition of the hard-coat. A commercial formulation sold under trademark PR1133 by SDC Corporation is particularly suitable to deposit the primer layer for the thermally curable MP1154D formulation.

In one embodiment, before deposition of an AR coating, the surface of an article that has been pre-coated with the hard-coat layer is modified by chemical etching or by corona discharge. Chemical etching solutions, preferably prepared using NaOH or KOH and water, may be used to modify the surface of the hard-coat layer. This surface modification increases the adhesion between the AR coating and the hard-coat layer. In another embodiment, the article may further incorporate a primer layer deposited onto at least one surface of the article after the hard-coat has been deposited. This primer layer also may provide a better adherence of the AR coating to the article surface.

A Low Refractive Index UV Curable Coating Composition

In one embodiment of the invention, a low refractive index coating composition is used to deposit one AR layer. This coating composition may be cured by exposing it to an actinic radiation, e.g., ultra-violet (UV) radiation. This low refractive index UV-curable coating composition is hereafter designated as the "LU" composition. The LU composition comprises at least one (meth)acrylate-functional silicon alkoxide, silica particles, at least one (meth)acrylate monomer, at least one epoxy (meth)acrylate oligomer, at least one photoinitiator, at least one solvent, at least one inorganic acid, and water.

In this invention, the term (meth)acrylate is used to designate chemical compounds having acrylate or methacrylate functional groups.

Examples of a suitable silicon alkoxide with (meth)acrylate functionalities, which may be used in preparation of the LU composition, include (3-acryloxypropyl)dimethylmethoxysilane, (3-acryloxypropyl)methlyldimethoxysilane, (3-acryloxypropyl)trimethoxysilane, (methacryloxymethyl) dimethylethoxysilane, methacryloxymethyltriethoxysilane, methacryloxymethyltrimethoxysilane, methacryloxypropylmethyldiethoxysilane, methacryloxypropylmethyldimethoxysilane, (3-methacryloxypropyl)triethoxysilane, (3-methacryloxypropyl)trimethoxysilane, mixtures thereof, and the like. In one embodiment, the (meth)acrylate functional silicon alkoxide is (3-acryloxypropyl)trimethoxysilane.

The silica particles may be any silica particles miscible with the LU composition. In various embodiments, the average particle size may be smaller than about 100 nm, or more preferably smaller than about 50 nm. The silica particles may be added to a coating composition in the form of a dry powder, or in a colloidal dispersion in a suitable liquid, or in another form. Dry powders and/or colloidal dispersions of silica particles in aqueous or non-aqueous solutions are commercially available from various sources including Nalco Company (Naperville, Ill.), Nyacol Nano-Technologies Incorporated (Ashland, Mass.), Nissan Chemical Industries (Tokyo, Japan), Grace Davison (Columbia, Md.), Clariant Corporation (Charlotte, N.C.), Cabot Corporation (Billerica, Mass.), Degussa Advanced Nanomaterials (Hanau-Wolfgang, Germany), and Catalysts and Chemicals Industries (Tokyo, Japan).

In some cases, the silica particles have functional groups on their surfaces that are suitable for increasing the miscibility of the particles with the LU composition. Silica particles having such functional groups may be commercially obtained from Nissan Chemical Industries, Clariant Corporation, and Cabot Corporation. Preparation of such particles is also described in references such as U.S. Pat. No. 6,335,380 to Wilhelm, which describes a method for surface modification of colloidal silica with a vinyl silane, and European patent publication No. EP 0505737 to Tilley, which describes preparation of (meth) acrylate functionalized colloidal silica.

The (meth)acrylate monomer that may be used in preparation of the LU composition may be any monofunctional or multifunctional monomer. It may also be in any ethoxylated or propoxylated form. Suitable examples of the (meth)acrylate monomer include 2(2-ethoxyethoxy) ethyl acrylate, 2-phenoxyethyl acrylate, 2-phenoxyethyl methacrylate, caprolactone acrylate, dicyclopentadienyl methacrylate, tetrahydrofurfuryl acrylate, tetrahydrofurfuryl methacrylate, 1,3-butylene glycol diacrylate, 1,4 butanediol dimethacrylate, diethylene glycol diacrylate, ethoxylated bisphenol A diacrylate, ethoxylated bisphenol A dimethacrylate, ethylene glycol dimethacrylate, ethoxylated trimethylolpropane triacrylate, pentaeryhritol triacrylate, propoxylated glyceryl triacrylate, propoxylated trimethylolpropane triacrylate, trimethylolpropane triacrylate, trimethylolpropane trimethacrylate, tris(2-hydroxy ethyl) isocyanurate triacrylate, mixtures thereof and the like. In one embodiment, the (meth)acrylate monomer is ethoxylated trimethylolpropane triacrylate, tris(2-hydroxy ethyl) isocyanurate triacrylate, mixtures thereof, and the like. In another embodiment, the (meth)acrylate monomer is a mixture of ethoxylated trimethylolpropane triacrylate and tris(2-hydroxy ethyl) isocyanurate triacrylate. The (meth)acrylate monomers are commercially available, for example, from Sartomer Company (Exton, Pa.).

The epoxy (meth)acrylate oligomer that may be used in preparation of the LU composition may be any oligomer that has (meth)acrylate and epoxy functional groups. Such epoxy (meth)acrylate oligomers are commercially available, for example, from Sartomer Company under catalog numbers CN190, CN120, CNUVE151, CN120A75, CN112C60, and the like. Mixtures of such oligomers also may be used.

The photoinitiator that may be used for preparation of the LU composition may be any chemical compound that may initiate polymerization of (meth)acrylate functional groups by actinic radiation. Suitable photoinitiator examples are 1-hydroxy-cyclohexyl-phenyl-ketone, benzophenone, 2-hydroxy-2-methyl-1-phenyl-1-propanone, 2-hydroxy-1-[4-(2-hydroxyethoxy)phenyl]-2-methyl-1-propanone, 2-benzyl-2-(dimethylamino)-1-[4-(4-morpholinyl)phenyl]-1-butanone, diphenyl (2,4,6-trimethylbenzoyl)-phosphine oxide, the mixtures thereof, and the like. Photolatent base-type photoinitiators, for example, 2-methyl-1-[4-(methylthio)phenyl]-2-(4-morpholinyl)-1-propanone may also be used as the photoinitiator. In one embodiment, the photoinitiator is 1-hydroxy-cyclohexyl-phenyl-ketone, 2-methyl-1-[4-(methylthio)phenyl]-2-(4-morpholinyl)-1-propanone, mixtures thereof, and the like. In one embodiment, the photoinitiator is a mixture of 1-hydroxy-cyclohexyl-phenyl-ketone and 2-methyl-1-[4-(methylthio)phenyl]-2-(4-morpholinyl)-1-propanone. Such photoinitiators are commercially available, for example from Ciba Specialty Chemicals (Tarrytown, N.Y.).

Suitable solvents that may be used to prepared the LU composition, include methanol, ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propyl acetate, n-butyl acetate, t-butyl acetate, propylene glycol monomethyl ether acetate, dipropylene glycol methyl ether acetate, 1-methoxy-2-propanol, ethyl 3-ethoxypropionate, 2-propoxyethanol, ethylene glycol ethyl ether acetate, mixtures thereof, and the like. In one embodiment, the solvent is isopropanol, ethyl acetate, 1-methoxy 2-propanol, mixtures thereof, and the like. In another embodiment, the solvent is a mixture of isopropanol, ethyl acetate, and 1-methoxy 2-propanol.

The inorganic acid that may be used to prepare the LU composition may be any acid that can catalyze the sol-gel hydrolysis and polymerization reactions of the (meth)acrylate functional silicon alkoxide. Suitable inorganic acids are hydrochloric acid, nitric acid, sulfuric acid, hydrofluoric acid, mixtures thereof, and the like.

The relative amount of each chemical compound forming the LU composition, i.e., the (meth)acrylate functional silicon alkoxide, the silica particles, the (meth)acrylate monomer, the epoxy (meth)acrylate oligomer, the photoinitiator, the photo latent base, the solvent, and the water, is controlled such that when the coating composition is deposited to form a low-index layer, the layer has a refractive index less than 1.60, or more preferably less than 1.55, or most preferably less than 1.50, at a wavelength of 510 nm. Preparation of the LU composition is demonstrated by way example in EXAMPLE 7, below.

After this coating composition has been applied to the article but before it has been cured by exposure to the UV radiation, the article may be heat-treated to improve the coating's adhesion. In one embodiment, this heat treatment is carried out after a fourth-layer of the AR coating has been applied using the LU composition.

High Refractive Index Coating Composition

In one embodiment of the invention, a high refractive index coating composition is used to deposit an AR layer having a refractive index greater than 1.70, or more preferably greater than 1.80, or most preferably greater than 1.90. This high refractive index coating composition is hereafter designated as the "HT" composition. The HT composition comprises at least one organo-metallic compound (but not an organo-metallic compound of silicon), at least one epoxy-functional silicon alkoxide, at least one non-epoxy-functional silicon alkoxide, at least one curing agent that is compatible with epoxy-functional molecules, at least one solvent, at least one inorganic acid, and water.

The organo-metallic compound that may be used to prepare the HT composition may be any organo-metallic compound that can increase the refractive index of the AR layer to a value greater than 1.70, 1.80, or 1.90. Suitable examples of such an organo-metallic compound may be described by formulas $R^1_xM^1(OR^2)_{4-x}$, $R^1_yM^2(OR^2)_{3-y}$, $R^1_zNb(OR^2)_{5-z}$, and the like. Mixtures of such organo-metallic compounds also are suitable for such purpose. In these formulas, $M^1$ is a metal selected from the group consisting of Ti, Zr, Ge, and Sn; $M^2$ is a metal selected from the group consisting of Al, In, and Sb; $R^1$ is an organic functional group such as $C_1$-$C_4$ alkyl, vinyl, allyl, (meth)acryloxy, epoxide, and amino groups; and $R^2$ is $C_1$-$C_4$ alkyl group. In these formulas, x is 0, 1, 2, or 3; y is 0, 1, or 2; and z is 0, 1, 2, 3, or 4. Useful examples of such organo-metallic compounds are aluminum acrylate, aluminum ethoxide, aluminum isopropoxide, aluminum methacrylate, antimony III n-Butoxide, antimony III ethoxide, antimony III methoxide, germanium n-butoxide, germanium ethoxide, germanium isopropoxide, germanium methoxide, methacryloxy triethyl germane, indium methoxyethoxide, niobium V n-butoxide, niobium V ethoxide, tin II ethoxide, tin II methoxide, di-n-butyldiacrylate tin; di-n-butyldimethacrylate tin, titanium n-butoxide, titanium ethoxide, titanium isobutoxide, titanium isopropoxide, titanium methacrylate triisopropoxide, titanium methacryloxyethylacetoacetate triisoproxide, titanium n-propoxide; zirconium n-butoxide, zirconium t-butoxide, zirconium dimethacrylate dibutoxide, zirconium ethoxide, zirconium isopropoxide, zirconium methacrylate, zirconium methacryloxyethylacetoacetate tri-n-butoxide, zirconyl dimethacrylate, mixtures thereof, and the like. In one embodiment of this invention, the organo-metallic compound is titanium isopropoxide. Such metal alkoxides are commercially available, for example from Gelest (Morrisville, Pa.) and Aldrich (St. Lois, Mo.).

Suitable examples of the epoxy-functional silicon alkoxide that may be used to prepare the HT composition are 2-(3,4-epoxycyclohexyl)ethyltriethoxysilane, 2-(3,4-epoxycyclohexyl)ethyltrimethoxysilane, 5,6-epoxyhexyltriethoxysilane, (3-glycidoxypropyl)dimethylethoxysilane, (3-glycidoxypropyl)methyldiethoxysilane, glycidoxypropyl)methyldimethoxysilane, (3-glycidoxypropyl)trimethoxysilane, glycidoxymethyltrimethoxysilane, 3-glycidoxypropyltriethoxysilane, 3-cyanopropyltrimethoxysilane, mixtures thereof, and the like. In one embodiment of the invention, the epoxy-functional silicon alkoxide is (3-glycidoxypropyl)trimethoxysilane. Such epoxy functional silicon alkoxides are commercially available, for example, from Gelest.

A useful non-epoxy-functional silicon alkoxide that may be used to prepare the HT composition may be represented by a general formula $(OFG)_w$-Si—$(OR^3)_{4-w}$; wherein w equals 0, 1, 2 or 3; $OR^3$ is a hydrolyzable alkoxy group; $R^3$ is an alkyl; and OFG is an organofunctional group. In some embodiments, each OFG independently includes at least one functional group selected from the group consisting of acetyl, acrylate, alkoxyalkyl, alkyl (straight, branched, or cyclic), amino, aromatic, carbamate, carboxyl, cyano, ester, halogen, mercapto, methacrylate, or vinyl functional groups. Each OFG should have at least one carbon atom in addition to the functional group. In one embodiment, each OFG independently has from 1 to 100 carbon atoms. In another embodiment, each OFG independently has from 1 to 20 carbon atoms. In some embodiments, each alkyl group $R^3$ independently has from 1 to 20 carbon atoms. In other embodiments, each alkyl group $R^3$ independently has from 1 to 4 carbon atoms.

Suitable examples of the non-epoxy-functional silicon alkoxide that may be used to prepare the HT composition are acetoxypropyltrimethoxysilane; (3-acryloxypropyl)trimethoxysilane; allyltrimethoxysilane; 3-aminopropyltrimethoxysilane; 3-aminopropyltris(methoxyethoxyethoxy)silane; 3-aminopropylmethyldiethoxysilane; 3-aminopropyldimethylethoxysilane; 3-aminopropyltriethoxysilane; 3-(N-allylamino) propyltrimethoxysilane; N-(2-aminoethyl)-3-aminopropyltrimethoxysilane; 2-cyanoethyltriethoxysilane; 3-cyanopropyltrimethoxysilane; (heptadecafluoro-1,1,2,2-tetrahydrododecyl)triethoxysilane; 3-mercaptopropyltrimethoxysilane; (3-methacryloxypropyl) trimethoxysilane; (3-methacryloxypropyl)triethoxysilane; methacryloxymethyltrimethoxysilane; methacryloxymethyltriethoxysilane; tetraethoxysilane; tetramethoxysilane; (tridecafluoro-1,1,2,2-tetrahydrooctyl) triethoxysilane; (3,3,3-trifluoropropyl)trimethoxysilane; vinyltrimethoxysilane; vinyltriethoxysilane; mixtures thereof; and the like. In one embodiment of the invention, the non-epoxy-functional silicon alkoxide is tetraethoxysilane, tetramethoxysilane, or mixtures thereof. In another embodiment of the invention, the non-epoxy-functional silicon alkoxide is a mixture of tetraethoxysilane and tetramethoxysilane. Such non-epoxy-functional silicon alkoxides are commercially available, for example, from Gelest.

The curing agent that is used to prepare the HT composition may be any curing agent that is compatible with epoxy functional molecules. The curing agent may be an anhydride, a carboxylic acid, mixtures thereof, or the like. Suitable examples of anhydrides are acetic anhydride, acrylic anhydride, cyclic anhydride, hexahydrophthalic anhydride, methacrylic anhydride, propionic anhydride, mixtures thereof and the like. Possible carboxylic acid components include acetic acid, acrylic acid, formic acid, fumaric acid, itaconic acid, maleic acid, methacrylic acid, propionic acid, methylenesuccinic acid, mixtures thereof, and the like. In one embodiment of the invention, the curing agent is hexahydrophthalic anhydride. In another embodiment of the invention, the curing agent is methylenesuccinic acid.

Suitable solvents that may be used to prepare the HT composition include methanol, ethanol, propanol, isopropanol, butanol, isobutanol, secondary butanol, tertiary butanol, cyclohexanol, pentanol, octanol, decanol, di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol, tetrahydrofuran, dioxane, acetone, diacetone alcohol, methyl ethyl ketone, cyclohexanone, methyl isobutyl ketone, ethyl acetate, n-propyl acetate, n-butyl acetate, t-butyl acetate, propylene glycol monomethyl ether acetate, dipropylene glycol methyl ether acetate, 1-methoxy-2-propanol, ethyl 3-ethoxypropionate, 2-propoxyethanol, ethylene glycol ethyl ether acetate, mixtures thereof, and the like. In one embodiment of the invention, the solvent is ethanol, 1-methoxy 2-propanol, or mixtures thereof. In another embodiment of the invention, the solvent is a mixture of ethanol and 1-methoxy 2-propanol.

The inorganic acid that may be used to prepare the HT composition may be any acid that can catalyze the sol-gel hydrolysis and polymerization reactions of the organo-metallic compound, the epoxy-functional silicon alkoxide, and the non-epoxy-functional silicon alkoxide. Suitable inorganic acids are hydrochloric acid, nitric acid, sulfuric acid, hydrofluoric acid, mixtures thereof, and the like. In one embodiment of the invention, the inorganic acid is hydrochloric acid.

The relative amount of each chemical compound forming the HT composition, i.e., the organo-metallic compound, the epoxy-functional silicon alkoxide, the non-epoxy-functional silicon alkoxide, the curing agent, the solvent, the inorganic acid, and the water, is controlled such that when the coating composition is deposited to form a high-index layer, the layer has a refractive index greater than 1.70, or more preferably greater than 1.80, or most preferably greater than 1.90, at a wavelength of 510 nm. The preparation of HT composition is demonstrated by way of example in EXAMPLES 3-6, below.

The coating compositions of this invention all may be deposited onto the article using any suitable coating technique commonly known in the industry, including, for example, those techniques described in a publication entitled "Antireflection Coatings Made by Sol-Gel Processes," *Solar Energy Materials and Solar Cells*, Volume 68 (2001), pages 313 to 336, by Dinguo Chen. These coating techniques include spin-coating, dip-coating, roll-coating, flow-coating, and meniscus-coating. Spray-coating is less preferable, because it sometimes may be difficult to obtain uniform coatings using this technique. As described in U.S. Pat. No. RE 37,183 to Kawamura et al., coatings prepared by a spray-coating technique generally are thicker at the periphery than at the center. This non-uniformity may yield coatings providing poorer antireflective properties.

In the spin-coating technique, the article is held down steadily on a surface of a rotating chuck by application of vacuum. A predetermined volume of the liquid coating composition is dispensed onto the article surface, while the article is being spun, typically at speeds higher than 1,000 rpm. The coating composition thereby forms a thin layer or film on the article surface and may partially be dried during spinning. The article then may be cured on the chuck. Alternatively, the article may be removed from the spin-coater and cured, for example, in an oven. Typically, just one surface of the article is coated by the spin-coating technique during each AR coating run.

In the dip-coating technique, the transparent article is clamped to a cantilevered arm and dipped into a plastic container containing a coating composition. The plastic container and the cantilevered arm are enclosed within a chamber having controlled humidity. A drive system moves the cantilevered arm and the article down and up along a vertical or inclined axis. The range of motion must be sufficient to dip the article fully into, and out of, the container. Each AR layer is deposited by lowering the cantilevered arm and article at a predetermined speed into the container. After remaining submerged in the composition for a brief time duration, the article then is withdrawn from the composition at a predetermined speed. The drive system includes a suitably programmed computer, for precisely controlling the withdrawal speed of the arm and the article, so as to control the thickness of the layer being deposited. In general, slow withdrawal speeds yield thinner coating layers. The withdrawal speed is in the range of 0.1 cm/second to 0.5 cm/second. Typically, all of the article's surfaces are coated by dip-coating technique during each coating run.

For all of the identified coating techniques, the level of reflection for the destructive interference-type AR coating critically depends on the refractive index and thickness of each layer. The composition of the coating solution affects both of these parameters. The spin-speed of the spin-coater (or withdrawal-speed of the dip-coater) yielding the desired level of reflection is determined empirically by preparing a number of coatings, each having an AR layer deposited at a different spin speed (or withdrawal speed), and by then measuring the antireflective property of each coating. The spin speed (or withdrawal speed) yielding the best antireflective property then is selected to produce the AR layer.

The coating compositions of this invention may be heat-treated at any temperature for a time duration that does not physically or chemically degrade the coating and/or the article. For example, if the plastic article's glass transition temperature is exceeded during the coating process, the article may deform, rendering it useless for commercial purposes. At temperatures much higher than the glass transition temperature, the plastic articles may even chemically decompose. On the other hand, since these are time-dependent phenomena, such physical or chemical degradation may be avoided by shortening the heat treatment time. Thus, negative effects of higher heat-treatment temperatures may be avoided by shortening the processing time. The heat-treatment temperatures and time durations that yield the best curing conditions, while avoiding such degradation, may be determined empirically. This heat-treatment may be applied as an aid to the curing of a coating composition. For example, the LU composition may be heat-treated after it has been dispensed onto the surface of an article but before the curing by UV irradiation. Alternatively, this heat treatment may be applied to fully cure the coating composition, as in the case of the HT composition. This heat treatment also may be applied to improve the AR coating's adhesion and the abrasion resistance.

By using the coating compositions and the coating processes described above, the AR coating may be formed on the surfaces of transparent articles in a very short processing time. The processing time for formation of an AR coating on at least one surface of an article includes the time duration required for cleaning and drying of the article before or after deposition of each AR layer, as well as the time duration required for dispensing a coating composition onto the article's surface and curing of the coating composition. The processing time may also include the time duration required for deposition of a hard coat and/or primer layer. The processing time may also include the time duration required for a surface treatment of any one layer, including the hard coat. The processing time may further include the time duration required for moving an article before or after each of these individual processing steps. Thus, the processing time is a total time duration required to coat at least one surface of an article with the AR coating of this invention. The processing time excludes the time duration required to deposit a hydrophobic layer on the AR coating.

The processing time preferably is less than 90 minutes, more preferably is less than 30 minutes, and most preferably is less than 10 minutes. For example, using the process of the invention, a fully cured five-Layer AR coating may be formed on one surface of an ophthalmic lens with a processing time of less than 7 minutes.

The method of the present invention may be better understood by reference to the following illustrative examples:

Example 1

Preparation of a Low Concentration Titania Coating Composition

A low concentration titania coating composition, prepared in this Example, is hereafter designated as the "LoT" composition. The preparation of the LoT composition is described in detail in U.S. Pat. No. 5,856,018 to Chen et al., the contents of which are incorporated herein by reference. This coating composition was prepared as follows:

In a container, about 317.1 grams of a reagent-grade ethanol (Fisher Scientific, Tustin, Calif., Catalog No. A995-4), about 5.9 grams of hydrochloric acid (about 36 wt % concentrated), and about 5.8 grams of water were mixed for about 5 minutes at about 200 rpm at ambient temperature, to form a first mixture. Then, about 106.4 grams of titanium isopropoxide were added to the first mixture, to form a second mixture. The second mixture was stirred for about 60 minutes at about 200 rpm. Then, about 1552.5 grams of the reagent grade ethanol, about 2.1 grams of the hydrochloric acid, and about 10.4 grams of water were added to the second mixture, to form a third mixture. After third mixture was stirred for about 5 hours at about 200 rpm, it was filtered through a 0.2 μm filter, to form the LoT composition.

Example 2

Preparation of a Medium Concentration Titania Coating Composition

A medium concentration titania coating composition, prepared in this Example, is hereafter designated as the "LoT" composition. The preparation of the MdT composition is described in detail in U.S. Pat. No. 5,856,018 to Chen et al. This coating composition was prepared as follows:

In a container, about 448.17 grams of reagent grade ethanol, about 8.31 grams of hydrochloric acid (about 36 wt % concentrated), and about 8.13 grams of water were mixed for 5 minutes at about 200 rpm at ambient temperature, to form a first mixture. Then, about 150.34 grams of titanium isopropoxide were added to the first mixture, to form a second mixture. This second mixture was stirred for about 60 minutes at about 200 rpm. Then, about 1374.52 grams of the reagent grade ethanol, about 2.93 grams of hydrochloric acid, and about 7.61 grams of water were added to the second mixture to form a third mixture. After the third mixture was stirred for about 5 hours at about 200 rpm, it was filtered through a 0.2-μm filter, to form the MdT composition.

Example 3

Preparation of a High Refractive Index Titania Coating Composition

A high refractive index titania coating composition, prepared in this Example, is hereafter designated as the "HT1" composition. The HT1 coating composition was prepared as follows:

In a container, about 317.1 grams of reagent-grade ethanol, about 5.9 grams of hydrochloric acid (36 wt %), and about 5.7 grams of water were mixed for about 5 minutes, at about 200 rpm and at ambient temperature, to form a first mixture. Then, about 106.4 grams of titanium tetraisopropoxide were added to the first mixture, to form a second mixture, and this second mixture was stirred for about 60 minutes, at about 200 rpm and at ambient temperature. Then, about 1552.5 grams of reagent-grade ethanol, about 2.1 grams of hydrochloric acid, and about 10.4 grams of water were added to the second mixture, to form a third mixture.

A fourth mixture was prepared by stirring a solution containing about 1.34 grams of 3-glycidoxypropyltrimethoxysilane (GPTMOS) purchased from Aldrich (St. Louis, Mo.), about 0.95 grams of hexahydrophthalic anhydride (HHPA) purchased from Lonza Chemicals (Basel, Switzerland), about 1.58 grams of tetramethyl orthosilicate (TMOS) purchased from Aldrich, about 1.98 grams of 1-methoxy 2-propanol purchased from Aldrich, about 1.4 grams of water, and about 32 grams of reagent alcohol for about 1 hour, at about 250 rpm and at ambient temperature.

A fifth mixture was prepared by adding the fourth mixture to the third mixture. After the fifth mixture was stirred for about 5 hours, at about 200 rpm and at ambient temperature, it was filtered through a 0.2-μm filter, to form the coating composition HT1.

Example 4

Preparation of a Second High Refractive Index Titania Coating Composition

The coating composition of this Example was prepared in the same manner as described in EXAMPLE 3, except that the about 0.95 grams of hexahydrophthalic anhydride (HHPA) used in the fourth mixture were replaced by about 1.70 grams of methylenesuccinic acid.

Example 5

Preparation of a Third High Refractive Index Titania Coating Composition

A high refractive index titania coating composition, prepared in this Example, is hereafter designated as the "HT3" composition. The HT3 composition was prepared as follows:

In a container, about 310.3 grams of reagent-grade ethanol, about 6.57 grams of hydrochloric acid (about 36 wt % concentrated), and about 2.63 grams of water were mixed for about 5 minutes, at about 200 rpm and at ambient temperature, to form a first mixture. Then, about 117.5 grams of titanium tetraisopropoxide were added to the first mixture, to form a second mixture. The second mixture was stirred for about 60 minutes, at about 200 rpm and at ambient temperature. Then, about 1146.6 grams of reagent-grade ethanol, about 2.18 grams of hydrochloric acid, and about 15.5 grams of water were added to the second mixture, to form a third mixture.

A fourth mixture was prepared by stirring a solution containing about 1.36 grams of 3-glycidoxypropyltrimethoxysilane (GPTMOS) purchased from Aldrich, about 0.935 grams of hexahydrophthalic anhydride (HHPA) purchased from Lonza Chemicals, about 1.75 grams of tetramethyl orthosilicate (TMOS) purchased from Aldrich, about 2.07 grams of 1-methoxy 2-propanol purchased from Aldrich, about 1.56 grams of water, and about 33.3 grams of reagent alcohol for about 1 hour, at about 250 rpm and at ambient temperature.

A fifth mixture was prepared by adding the fourth mixture to the third mixture. After stirring the fifth mixture for about 5 hours, at about 200 rpm and at ambient temperature, it was filtered through a 0.2-μm filter, to form the HT3 composition.

Example 6

Preparation of a Fourth High Refractive Index Titania Coating Composition

The coating of this Example was prepared in the same manner as described in EXAMPLE 5, except that the about 0.935 grams of hexahydrophthalic anhydride (HHPA) that was used in the fourth mixture was replaced by about 1.87 grams of methylenesuccinic acid.

Example 7

Preparation of a Low Refractive Index UV-Curable Coating Composition

An LU composition is prepared as follows: In a container, about 21.056 grams of about 30 wt % colloidal silica solution in isopropyl alcohol, purchased from Nissan Chemicals (Houston, Tex., catalog no. IPA-ST), about 7.579 grams of (3-acryloxypropyl)trimethoxysilane, and about 0.664 grams of water containing about 0.1 normal hydrochloric acid were mixed to form a first mixture. The first mixture was then sealed in a closed container and heated to about 45° C. and held at that temperature for about 60 minutes under sonication using Model FS220H sonicator purchased from Fisher Scientific.

In a three-liter container, which is covered with an aluminum sheet to prevent its contents from being exposed to outside light, about 4.914 grams of ethoxylated trimethylolpropane triacrylate purchased from Sartomer Corporation (Exton, Pa.) under catalog number SR-454, about 4.914 grams of bisphenol-A epoxy acrylate oligomer purchased from Sartomer Corporation under catalog number CN120, about 2.541 grams of tris(2-hydroxy ethyl) isocyanurate triacrylate, purchased from Sartomer Corporation under catalog number SR-368D, about 0.847 grams of a photoinitiator 1-hydroxy-cyclohexyl-phenyl-ketone, purchased from Ciba Corporation (Tarrytown, N.Y.) under catalog number Irgacure 184, and about 0.170 grams of a photo latent base 2-methyl-1-[4-(methylthio)phenyl]-2-(4-morpholinyl)-1-propanone purchased from Ciba Corporation under catalog number 907 were mixed to form a second mixture. The second mixture was stirred for about 5 minutes at about 200 rpm.

To the second mixture, about 110 grams of ethyl acetate and about 305 grams of 1-methoxy-2-propanol were added, to form a third mixture. The third mixture was stirred at about 250 rpm for about 30 minutes, at ambient temperature.

A fourth mixture was formed by mixing together in a container the third mixture, the first mixture, and about 1542.2 grams of isopropanol. The fourth mixture was sealed and stirred at about 250 rpm for about 60 minutes, at ambient temperature. Then, the fourth mixture was filtered through a 10-μm filter, to form the LU composition.

Example 8

Preparation of a Low Refractive Index UV-Curable Organo-Siloxane Coating Composition A low refractive index UV-curable organo-siloxane coating composition, prepared in this Example, is hereafter designated as the "DMP11" composition. The DMP11 composition was prepared as follows:

In a container covered by aluminum sheet to prevent its contents from being exposed to outside light, about 135.8 grams of a UV-curable organo-siloxane purchased from SDC Corporation, Anaheim, Calif. under catalog number MP-1175, about 452.4 grams of 1-methoxy-2 propanol, about 1276.0 grams of isopropyl alcohol, and about 135.8 grams of ethyl acetate were mixed to form a first mixture. This first mixture was stirred at about 250 rpm for about 60 minutes, in ambient conditions. The first mixture then was filtered through a 10-μm filter, to form the DMP11 composition.

Example 9

Preparation of a First Low Refractive Index Silica Coating Composition

The Low Refractive Index Silica Coating Composition is hereafter designated as the "LS2" composition. Preparation of the LS2 composition is described in detail in U.S. Pat. No. 5,856,018 to Chen et al. The LS2 coating composition was prepared as follows. In a container, about 28.3 grams of reagent-grade ethanol, about 52.6 grams of tetraethyl orthosilicate (TEOS) purchased from Aldrich, about 2.6 grams of hydrochloric acid (about 36 wt %), and about 15.3 grams of water were mixed for about 30 minutes, at about 200 rpm and at ambient temperature, to form a first mixture. Then, about 901.2 grams of reagent-grade alcohol were added to the first mixture, to form a second mixture. After the second mixture was stirred for about 5 hours, at about 200 rpm and at ambient temperature, it was filtered through a 0.2-μm filter, to form the LS2 composition.

Example 10

Preparation of a Second Low Refractive Index Silica Coating Composition

Another low refractive index silica coating composition is hereafter designated as the "LS4" composition. A detailed description of the preparation of the coating composition LS4 is disclosed in U.S. Pat. No. 5,856,018 to Chen et al. The LS4 coating composition was prepared as follows:

In a container, about 231.7 grams of reagent-grade ethanol, about 136.8 grams of tetraethyl orthosilicate (TEOS) purchased from Aldrich, about 4.7 grams of hydrochloric acid (about 36 wt %), and about 40.7 grams of water were mixed for about 30 minutes, at about 200 rpm and at ambient temperature, to form a first mixture. Then, about 586.1 grams of reagent alcohol were added to the first mixture, to form a second mixture. After the second mixture was stirred for about 5 hours, at about 200 rpm and at ambient temperature, it was filtered through a 0.2-μm filter, to form the coating composition LS4.

Example 11

Preparation of a Hydrophobic Coating Composition

The preparation of a hydrophobic coating composition used to deposit a hydrophobic layer was described in detail in U.S. Pat. No. 6,395,331 to Yan et al., the contents of which are incorporated by reference. The hydrophobic coating composition was prepared in a two-step procedure. First, in a container, about 38.5 grams of isopropanol, about 2.8 grams of water, about 0.7 gram of hydrochloric acid (about 36 wt % concentrated), and about 0.4 grams of 1H, 1H, 2H, 2H,-perfluorodecyltriethoxysilane were mixed together, to form a first mixture. This first mixture was stirred for about 2 hours at about 250 rpm, at ambient temperature. The first mixture then was mixed with about 0.1 gram of 1H, 1H, 2H, 2H,-perfluorodecyltriethoxysilane, about 495.3 grams of water, about 418.3 grams of isopropanol, and about 44 grams of ethylene glycol, to form a second mixture. The second mixture was stirred at about 250 rpm for about 1 hour and then filtered through a 0.2-μm filter to produce the hydrophobic coating composition.

Example 12

Five-Layer AR Coating with a Hydrophobic Layer on an Ophthalmic Lens

In this example, the coating compositions were successively deposited, using a conventional spin-coating process, to form a five-layer AR coating on both the convex surface and the concave surface of a polycarbonate (PC) ophthalmic lens. The spin coater used in this experiment was manufactured by Gerber Coburn, South Windsor, Conn., under the catalog name Stratum Lens Coating System. The PC lens was purchased from Essilor Corporation, Dudley, Mass. under the trademark Airwear. The lens, as purchased, had a hard-coat on both of its surfaces. Before the deposition of the first AR layer, the lens was cleaned by dispensing about 1 ml of ethanol on a clean room cloth and then wiping both surfaces of the lens with this cloth. The lens then was dried by blowing compressed air.

First the convex surface of the lens was coated with a five-layer AR coating using the process described below. This process was then repeated for the lens' concave surface.

A first AR layer was deposited on the lens' convex surface using the LoT composition prepared in EXAMPLE 1. The liquid composition was applied by manually dispensing in the range of 0.5 ml to 1 ml of solution onto the convex surface, over a time duration of about 20 seconds, while the lens was being spun at a spin speed of about 2,800 rpm. This first AR layer was cured at about 130° C. within about 1 minute using a heat gun.

A second AR layer was deposited onto the lens' convex surface using the LU composition prepared in EXAMPLE 7. The liquid composition was applied by manually dispensing in the range of 0.5 ml to 1 ml of solution onto the lens surface, over a time duration of about 20 seconds, while the lens was being spun at a spin speed of about 3,500 rpm. This layer was cured in the spin coater by first purging its chamber for about 15 seconds with nitrogen and then exposing the lens to UV radiation for about 20 seconds. The UV radiation energy received by the article was measured by placing a radiometer in place of the lens. This radiometer is manufactured by EIT Incorporated, Sterling, Va. with a trademark MicroCure. It was found that about 20 seconds of exposure to the UV radiation caused absorption of about 2.2 J/cm$^2$ energy by the radiometer. The temperature in the UV chamber was initially about 30° C., but the temperature of the lens surface increased to about 230° C. after having received the UV radiation, as measured by a temperature tape manufactured by Paper Thermometer Co., Greenfield, N.H. Although this temperature exceeded the lens' glass transition temperature, no warpage of the lens was visible.

A third AR layer was deposited onto the lens' convex surface using the MdT composition prepared in EXAMPLE 2. The liquid composition was applied by manually dispensing in the range of 0.5 ml to 1 ml of solution onto the lens surface over a time duration of about 20 seconds, while the lens was being spun at a spin speed of about 1,400 rpm. This layer was cured at about 130° C. within about 1 minute using a heat gun.

A fourth AR layer was deposited onto the lens' convex surface using the LU composition prepared in EXAMPLE 7. The liquid composition was applied by manually dispensing in the range of 0.5 ml to 1 ml of solution onto the lens surface, over a time duration of about 20 seconds, while the lens was being spun at a spin speed of about 3,500 rpm. The deposited layer was heat treated at about 130° C. for about 1 minute using a heat gun, and it was then further cured in the spin coater by first purging its chamber for about 15 seconds with nitrogen and then exposing the lens to UV radiation for about 20 seconds.

A fifth AR layer was deposited onto the lens' convex surface using the DMP11 composition prepared in EXAMPLE 8. The liquid composition was applied by manually dispensing in the range of 0.5 ml to 1 ml of solution onto the lens surface, over a time duration of about 20 seconds, while the lens was being spun at a spin speed of about 3,500 rpm. This layer was cured in the spin coater by first purging its chamber for about 15 seconds with nitrogen and then exposing the lens to UV radiation for about 20 seconds.

After the deposition of the fifth AR layer on the convex surface, the lens was removed from the spin coater, and the concave surface was cleaned by dispensing about 1 ml of ethanol on a clean room cloth and then wiping the concave surface of the lens with this cloth. The lens then was dried by blowing compressed air. Finally, the same deposition process was repeated to coat the lens' concave surface with same five-layer AR coating.

The processing time for forming this five-layer AR coating on one surface of the lens was less than 7 minutes. This five-layer coating is depicted schematically in FIG. 1, deposited onto a polycarbonate (PC) ophthalmic lens. The second and fourth layers of the coating, which were deposited using the LU coating composition, yielded a refractive index of less than 1.50. The LU coating composition has a stable pot life longer than 90 days.

Finally, a hydrophobic layer was deposited onto the fifth layer using the hydrophobic coating composition prepared in EXAMPLE 11. The liquid composition was applied to both surfaces of the lens by manually dipping the lens into the composition for about 10 seconds. This layer was cured at about 130° C. within about 1 minute using a heat gun.

The five-layer AR coating, with the hydrophobic overlayer, was tested for its mechanical and optical properties. The adhesion of the coating was tested using a cross-cut tape adhesion test described in Japanese Industrial Standard JIS 5600-5-6. This test was carried out using 3M No. 600 adhesion tape. The adhesion of the AR coating was determined to be Y1, which is considered to be a passing level of adhesion, within the scope of this invention. It was found that the about one-minute heat treatment of the fourth layer at 130° C. using a heat gun, before the UV curing, improved the AR coating's adhesion. When there was no heat treatment, the AR coating failed at the cross-hatch adhesion test, i.e., the adhesion was not Y1. This heat treatment allowed the AR coating to pass the cross-hatch test.

This AR coating had at least 2H pencil hardness. The antireflective property of this coating is shown in FIG. 2.

Example 13

Four-Layer AR Coating on an Ophthalmic Lens

In this Example, the coating compositions were successively deposited using a conventional spin-coating process, to form a four-layer AR coating on both the convex surface and the concave surface of a polycarbonate (PC) lens. Stratum Lens Coating System was used in this Example. The PC lens was purchased from Essilor Corporation under the trademark Airwear. The lens, as purchased, had a hard-coat on both of its surfaces. Before the deposition of the first AR layer, the lens was cleaned by dispensing about 1 ml of ethanol on a clean room cloth and then wiping both surfaces of the lens with the cloth. The lens then was dried by blowing compressed air.

First, the convex surface of the lens was coated with a four-layer AR coating using the process described below. This process was then repeated for the concave surface.

A first AR layer was deposited onto the convex surface of the lens using the HT1 composition prepared in EXAMPLE 4. The liquid composition was applied by manually dispensing in the range of 0.5 ml to 1 ml of solution onto the lens' convex surface, over a time duration of about 20 seconds, while the lens was being spun at a spin speed of about 2,800 rpm. This layer was cured at about 130° C. within about 1 minute using a heat gun.

A second AR layer was deposited onto the lens' convex surface using the LU composition prepared in EXAMPLE 7. The liquid composition was applied by manually dispensing in the range of 0.5 ml to 1 ml of solution onto the lens surface, over a time duration of about 20 seconds, while the lens was being spun at a spin speed of about 3,500 rpm. The layer was cured in the spin coater by first purging its chamber for about 15 seconds with nitrogen and then exposing the lens to UV radiation for about 20 seconds.

A third AR layer was deposited onto the lens' convex surface using the HT3 composition prepared in EXAMPLE 6. The liquid composition was applied by manually dispensing in the range of 0.5 ml to 1 ml of solution onto the lens surface, over a time duration of about 20 seconds, while the lens was being spun at a spin speed of about 1,400 rpm. This layer was cured at about 130° C. within about 1 minute using a heat gun.

A fourth AR layer as deposited onto the lens' convex surface using the LS4 composition prepared in EXAMPLE 10. The liquid composition was applied by manually dispensing in the range of 0.5 ml to 1 ml of solution onto the lens surface, over a time duration of about 20 seconds, while the lens was being spun at a spin speed of about 3,000 rpm. The layer then was cured in an oven at about 100° C. within about 7.5 minutes, after which the layer was further cured in the oven at about 100° C. in about 75% relative humidity for about 10 minutes.

After the deposition of the fourth AR layer on the lens' convex surface, the lens was removed from the spin coater and the concave surface was cleaned by dispensing about 1 ml of ethanol on a clean room cloth and then wiping the lens' concave surfaces with the cloth. The lens was then dried by blowing compressed air. Finally, the same deposition process was repeated to coat the lens' concave surface with the same four-layer AR coating.

The processing time for forming this four-layer AR coating on one surface of the lens was less than 22 minutes.

Figure 3:
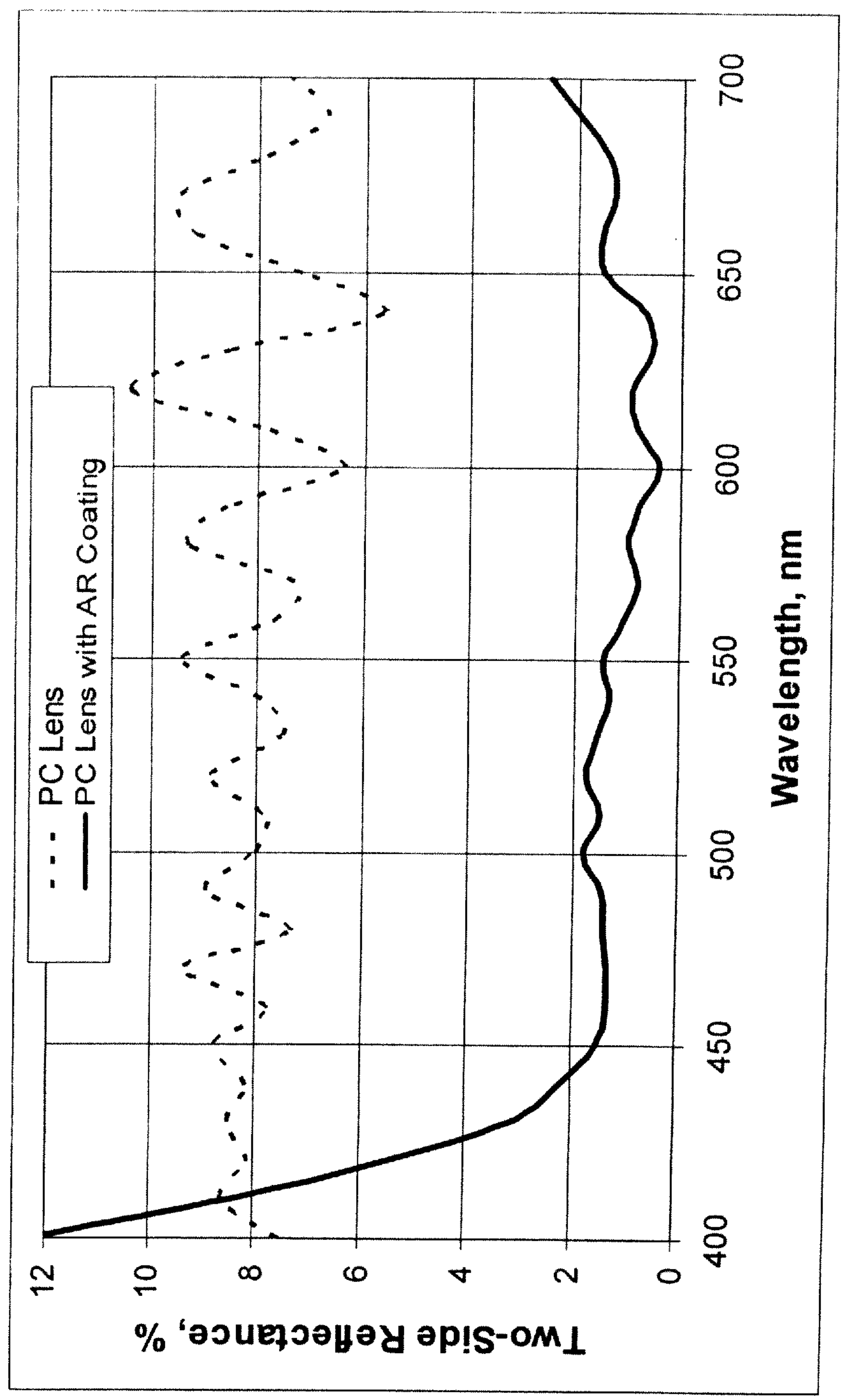
FIG. 3 is a graph depicting the reflectance of a PC lens, with the four-layer AR coating of Example 13 deposited onto both its convex surface and its concave surface, and without such coating, as a function of wavelength.

The AR coating of this Example was tested for its optical and mechanical properties. As shown in FIG. 3, the coating had good optical properties. As prepared, the AR coating passed the crosshatch adhesion test using 3M No. 600 adhesion tape. In addition, the coating was analyzed using an ellipsometer with a model name Vase, manufactured by J. A. Woollam Corporation, Lincoln Nebr., to determine the refractive index of each layer. The first layer, deposited using the compositions HT1, was measured to have a refractive index of about 1.96; the second layer, deposited using the composition LU, was measured to have a refractive index of about 1.50; the third layer, deposited using the composition HT3, was measured to have a refractive index of about 1.95; and the fourth layer, deposited using the composition LS4, was measured to have a refractive index of about 1.44.

Example 14

Four-Layer AR Coating with a Hydrophobic Layer on an Ophthalmic Lens

In this Example, a four-layer AR coating was deposited onto an ophthalmic lens in the same manner as described in EXAMPLE 13. In this Example, a hydrophobic coating layer was deposited onto the fourth layer onto both surfaces of the lens using the hydrophobic coating composition prepared in EXAMPLE 11. The liquid composition was applied to the lens surfaces by manually dipping the lens into the composition for about 10 seconds. This layer was cured at about 130° C. within about 1 minute using a heat gun.

The AR coating was tested for its optical and mechanical properties. The coating had good optical properties, similar to those shown in FIG. 3. As prepared, the AR coating passed the crosshatch adhesion test using 3M No. 600 adhesion tape.

The water contact angle of the lens having a hydrophobic top coating layer was about 110°. After rubbing the lens using a lens cleaning cloth identified by the trademark Buff-Off, purchased from Quality Accessories Inc, Munster, Ind., for about 20,000 cycles, at about 3 psi pressure, the water contact angle was reduced to about 102°. No coating delamination occurred during this cloth rub test. Both high contact angle and no delamination after the rub test indicated that this coating had very good abrasion resistance properties.

Example 15

Five-Layer AR Coating with a Hydrophobic Layer on an Ophthalmic Lens

In this Example, the coating compositions were successively deposited using a conventional spin-coating process, to form a five-layer AR coating on both the convex surface and the concave surface of a polycarbonate (PC) ophthalmic lens. Stratum Lens Coating System was used in this Example. The PC lens was purchased from Essilor Corporation under the trademark Airwear. The lens, as purchased, had a hard-coat on both of its surfaces. Before the first AR layer was deposited, the lens was cleaned by dispensing about 1 ml of ethanol onto a clean room cloth and then wiping both lens surfaces with the cloth. The lens then was dried by blowing compressed air.

First, the convex surface of the lens was coated with a five-layer AR coating with a process described below. This process was then repeated for the concave surface.

A first AR layer was deposited onto the lens' convex surface using the HT1 composition prepared in EXAMPLE 4. The liquid composition was applied by manually dispensing in the range of 0.5 ml to 1 ml of solution onto the lens' convex surface, over a time duration of about 20 seconds, while the lens was being spun at a spin speed of about 2,800 rpm. The layer was cured at about 130° C. within about 1 minute using a heat gun.

A second AR layer was deposited onto the lens' convex surface using the LU composition prepared in EXAMPLE 7. The liquid composition was applied by manually dispensing in the range of 0.5 ml to 1 ml of solution onto the lens surface, over a time duration of about 20 seconds, while the lens was being spun at a spin speed of about 3,500 rpm. The layer was cured in the spin coater by first purging its chamber for about 15 seconds with nitrogen and then exposing the lens to UV radiation for about 20 seconds.

A third AR layer was deposited onto the lens' convex surface using the HT3 composition prepared in EXAMPLE 6. The liquid composition was applied by manually dispensing in the range of 0.5 ml to 1 ml of solution onto the lens surface, over a time duration of about 20 seconds, while the lens was being spun at a spin speed of about 1,400 rpm. This layer was cured at about 130° C. within about 1 minute using a heat gun.

A fourth AR layer was deposited onto the lens' convex surface using the LU composition prepared in EXAMPLE 7. The liquid composition was applied by manually dispensing in the range of 0.5 ml to 1 ml of solution onto the lens surface, over a time duration of about 20 seconds, while the lens was being spun at a spin speed of about 3,500 rpm. The layer was partially cured at about 130° C. within about 1 minute using a heat gun, and it then was further cured in the spin coater by first purging its chamber for about 15 seconds with nitrogen and then exposing the lens to UV radiation for about 20 seconds.

A fifth AR layer was deposited onto the lens' convex surface using the DMP11 composition prepared in EXAMPLE 8. The liquid composition was applied by manually dispensing in the range of 0.5 ml to 1 ml of solution onto the lens surface, over a time duration of about 20 seconds, while the lens was being spun at a spin speed of about 3,500 rpm. The layer was cured in the spin coater by first purging its chamber for about 15 seconds with nitrogen and then exposing the lens to UV radiation for about 20 seconds.

After the fifth AR layer was deposited, the lens was removed from the spin coater and the concave surface was cleaned by dispensing about 1 ml of ethanol onto a clean room cloth and then wiping the lens' concave surface with the cloth. The lens then was dried by blowing compressed air. Finally, the same deposition process was repeated to coat the lens' concave surface with a similar five-layer AR coating.

The processing time for forming the five-layer AR coating for one surface of the lens was less than 7 minutes.

Finally, a hydrophobic layer was deposited onto the fifth layers of the two five-layer AR coatings using the hydrophobic coating composition prepared in EXAMPLE 11. The liquid composition was applied to the lens surfaces by manually dipping the lens into the composition for about 10 seconds. This layer was cured at about 130° C. within about 1 minute using a heat gun.

Figure 4:
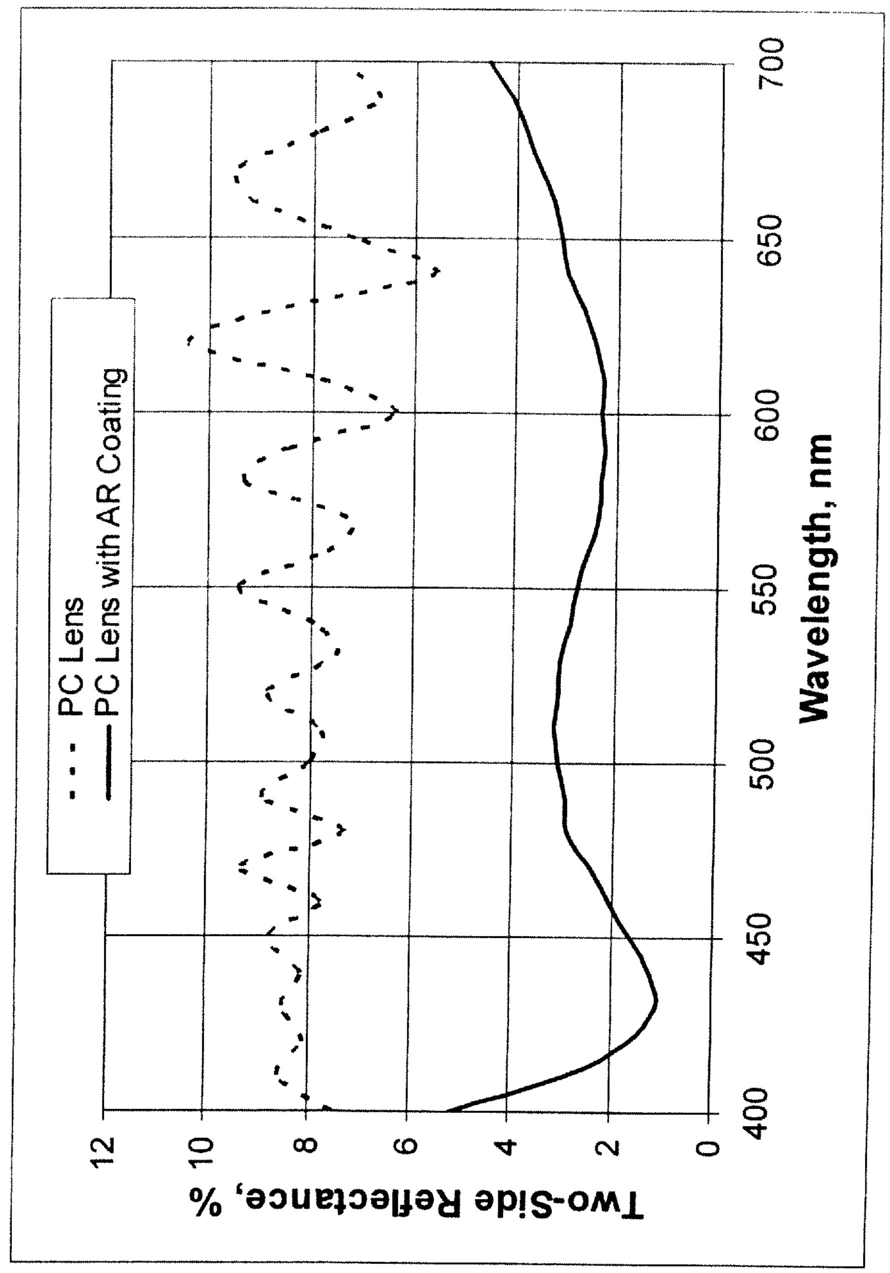
FIG. 4 is a graph depicting the reflectance of a PC lens, with the five-layer AR coating of Example 15 deposited onto both its convex surface and its concave surface, and without such coating, as a function of wavelength.

The AR coating was tested for its optical and mechanical properties. As shown in FIG. 4, the coating had good optical properties. In addition, the coating was analyzed using the Vase ellipsometer, to determine the refractive index of each layer. The first layer, deposited using the compositions HT1, was measured to have a refractive index of about 1.96; the second layer, deposited using the composition LU, was measured to have a refractive index of about 1.50; the third layer, deposited using the composition HT3, was measured to have a refractive index of about 2.05; the fourth layer, deposited using the composition LU, was measured to have a refractive index of about 1.50; and the fifth layer, deposited using the composition DMP11, was measured to have a refractive index of about 1.53.

The AR-coated lens of this Example passed the crosshatch tape-adhesion test, both before and after depositing the hydrophobic layer. The water contact angle was measured to be 110° after applying the hydrophobic layer. No delamination occurred after a 20,000-cycle cloth rub test, at about 3 psi pressure. The coated lens also passed the crosshatch tape-adhesion test after the lens had been treated at about 95% relative humidity, in an about 65° C. oven, for about 24 hours. All these tests indicated that this AR coating with hydrophobic layer had very good optical and mechanical properties.

Example 16

Four-Layer AR Coating on a Flat Panel

In this example, both surfaces of a flat poly(methyl methacrylate) (PMMA) panel were coated with a four-layer AR coating as follows. The coating compositions were successively deposited onto the panel using a conventional dip-coating process. The PMMA panel was purchased from Cyro Corporation, Macon, Ga., under the trademark Acrylite. The panel thickness was about 2 mm, with a size of about 20 cm×about 18 cm. Both surfaces of the PMMA panel were first dip-coated with a basecoat of UVB510R6, manufactured by Red Spot Corporation, to a thickness of about 4.5 micrometers.

A first AR layer then was deposited onto the panel using the HT1 composition prepared in EXAMPLE 3. The dip-coating chamber was controlled to have a temperature of about 23° C. and a relative humidity of about 60%. The panel was lowered into the HT1 composition at a speed of about 1 cm/second and kept submerged for about 10 seconds. The panel then was withdrawn from the dip-coating tank at a speed of about 0.2 cm/second. Finally, the layer was cured in an oven, at about 100° C. for about 10 minutes.

A second AR layer was deposited onto this panel using the LS2 composition prepared in EXAMPLE 9. The dip-coating chamber was controlled to have a temperature of about 23° C. and a relative humidity of about 25%. The panel was lowered into the LS2 composition at a speed of about 1 cm/second and kept submerged for about 10 seconds. The panel then was withdrawn from the dip-coating tank at a speed of about 0.11 cm/second. Finally, the layer was cured in an oven, at about 100° C. for about 15 minutes.

A third AR layer was deposited onto this panel using the HT3 composition prepared in EXAMPLE 5. The dip-coating chamber was controlled to have a temperature of about 23° C. and a relative humidity of about 60%. The panel was lowered into the HT3 composition at a speed of about 1 cm/second and kept submerged for about 10 seconds. The panel then was withdrawn from the dip-coating tank at a speed of about 0.29 cm/second. Finally, the layer was cured at about 100° C. for about 10 minutes using a heat gun.

A fourth AR layer was deposited onto this panel using the LS4 composition prepared in EXAMPLE 10. The dip-coating chamber was controlled to have a temperature of about 23° C. and a relative humidity of about 25%. The panel was lowered into the LS4 composition at a speed of about 1 cm/second and kept submerged for about 10 seconds. The panel then was withdrawn from the dip-coating tank at a speed of about 0.21 cm/second. The layer was cured in two steps. First, the layer was cured in an oven at about 100° C. for about 5 minutes, and second, the layer was further cured in the oven at about 100° C. for about 20 minutes at about 75% relative humidity.

Figure 5:
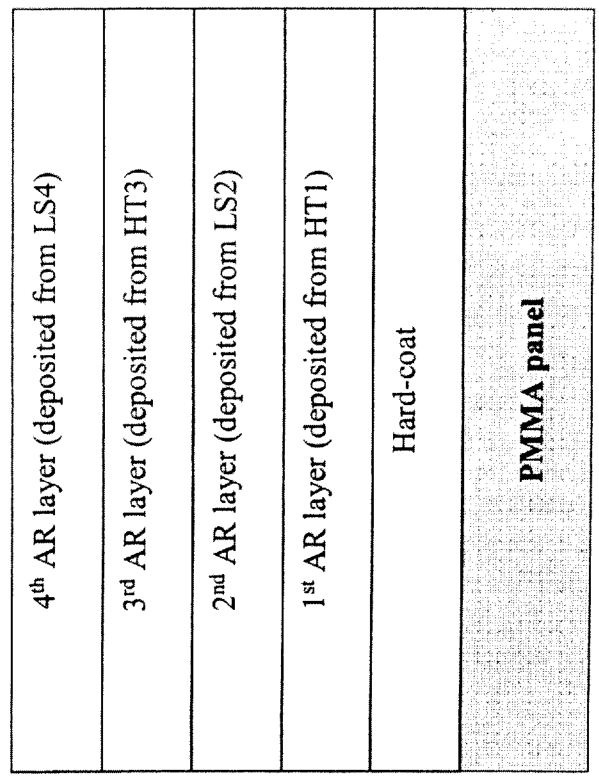
FIG. 5 is a schematic cross-sectional view of a four-layer AR coating and a hard-coat deposited onto one surface of a polymethylmethacrylate (PMMA) panel, as described in Example 16, below.

The processing time for forming the four layers of this AR coating, schematically shown in FIG. 5, was less than 80 minutes.

Figure 6:
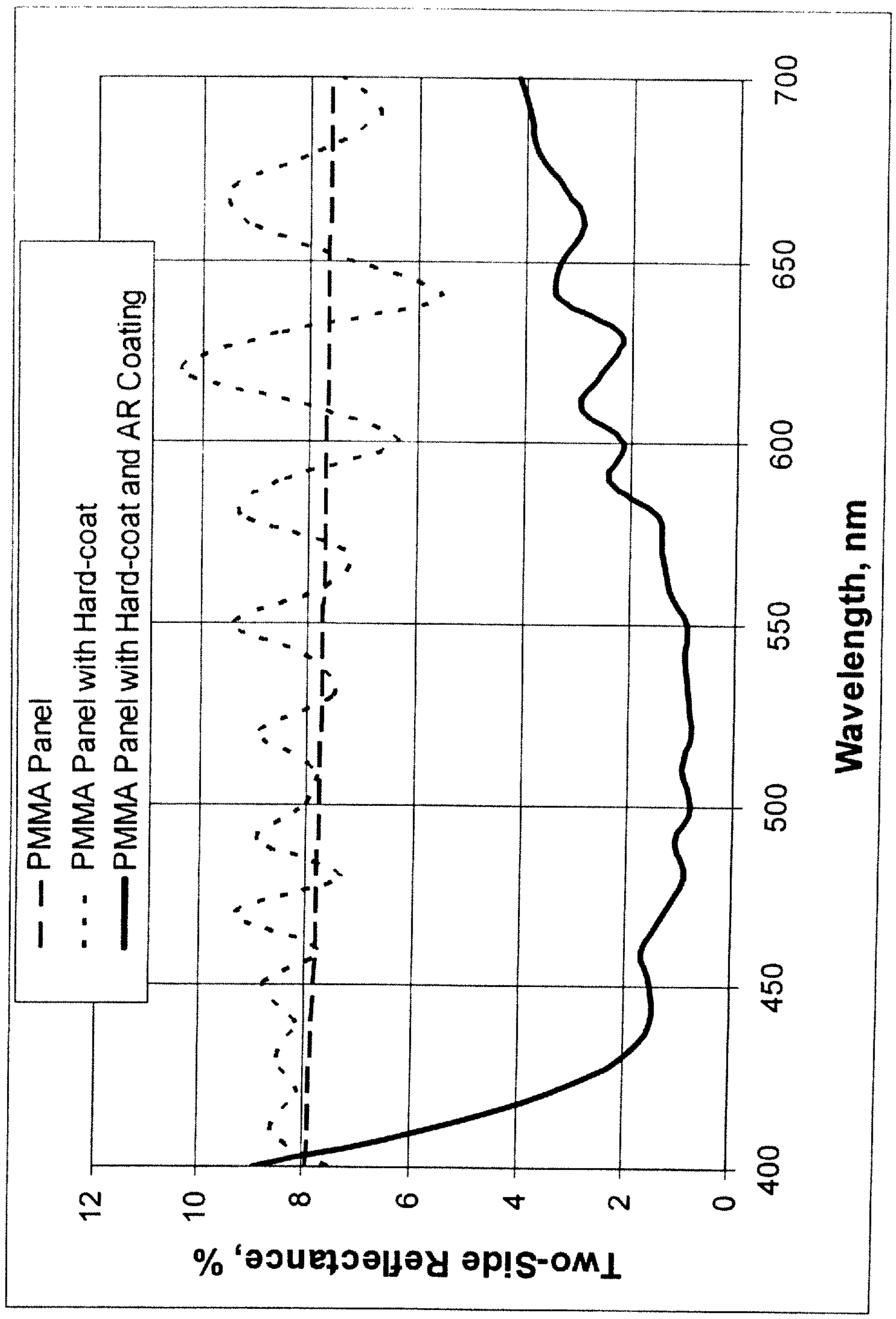
FIG. 6 is a graph depicting the reflectance of a PMMA panel, with the four-layer AR coating of Example 16 deposited onto both of its surfaces, and without such coating, as a function of wavelength.

The AR coating of this Example was tested for its optical and mechanical properties. As shown in FIG. 6, this coating had good optical properties. In addition, the coating was analyzed using the Vase ellipsometer, to determine the refractive index of each layer. The first layer, deposited using the compositions HT1, was measured to have a refractive index of about 1.95; the second layer, deposited using the composition LS2, was measured to have a refractive index of about 1.44; the third layer, deposited using the composition HT3, was measured to have a refractive index of about 1.95; and the fourth layer, deposited using the composition LS4, was measured to have a refractive index of about 1.44. As prepared, the AR coating passed the crosshatch adhesion test using 3M No. 600 adhesion tape.

Although several embodiments of the invention have been described in detail above, those of ordinary skill in the art will appreciate that various modifications may be made without departing from the scope of the invention. Accordingly, the invention is defined only by reference to the following claims.

We claim:

1. A coating composition comprising:

at least one (meth)acrylate-functional silicon alkoxide, silica particles, at least one (meth)acrylate monomer, at least one epoxy (meth)acrylate oligomer, at least one photoinitiator, at least one solvent, at least one acid, and water;

wherein the at least one epoxy (meth)acrylate oligomer has a concentration in the coating composition of about 0.25% by weight; and wherein the relative amounts of the constituents of the coating composition are controlled such that, when the coating composition is dispensed onto the surface of an article and cured, to form a coating having a thickness in the range of 10 to 200 nm, the coating has a refractive index less than 1.60 at a wavelength of 510 nm and exhibits a passing level of adhesion.

2. A coating composition as defined in claim 1, wherein the at least one (meth)acrylate-functional silicon alkoxide is selected from the group consisting of (3-acryloxypropyl)dimethylmethoxysilane, (3-acryloxypropyl)methlyldimethoxysilane, (3-acryloxypropyl)trimethoxysilane, (methacryloxymethyl)dimethylethoxysilane, methacryloxymethyltriethoxysilane, methacryloxymethyltrimethoxysilane, methacryloxypropylmethyldiethoxysilane, methacryloxypropylmethyldimethoxysilane, (3-methacryloxypropyl)triethoxysilane, (3-methacryloxypropyl)trimethoxysilane, and mixtures thereof.

3. A coating composition as defined in claim 1, wherein the at least one (meth)acrylate-functional silicon alkoxide is (3-acryloxypropyl)trimethoxysilane.

4. A coating composition as defined in claim 1, wherein the at least one (meth)acrylate monomer is selected from the group consisting of 2(2-ethoxyethoxy) ethyl acrylate, 2-phenoxyethyl acrylate, 2-phenoxyethyl methacrylate, caprolactone acrylate, dicyclopentadienyl methacrylate, tetrahydrofurfuryl acrylate, tetrahydrofurfuryl methacrylate, 1,3-butylene glycol diacrylate, 1,4 butanediol dimethacrylate, diethylene glycol diacrylate, ethoxylated bisphenol A diacrylate, ethoxylated bisphenol A dimethacrylate, ethylene glycol dimethacrylate, ethoxylated trimethylolpropane triacrylate, pentaeryhritol triacrylate, propoxylated glyceryl triacrylate, propoxylated trimethylolpropane triacrylate, trimethylolpropane triacrylate, trimethylolpropane trimethacrylate, tris(2-hydroxy ethyl) isocyanurate triacrylate, and mixtures thereof.

5. A coating composition as defined in claim 1, wherein the at least one (meth)acrylate monomer is selected from the group consisting of ethoxylated trimethylolpropane triacrylate, tris(2-hydroxy ethyl) isocyanurate triacrylate, and mixtures thereof.

6. A coating composition as defined in claim 1, wherein the at least one (meth)acrylate monomer is a mixture of ethoxylated trimethylolpropane triacrylate and tris(2-hydroxy ethyl) isocyanurate triacrylate.

7. A coating composition as defined in claim 1, wherein the at least one photoinitiator is selected from the group consisting of 1-hydroxy-cyclohexyl-phenyl-ketone, 2-methyl-1-[4-(methylthio)phenyl]-2-(4-morpholinyl)-1-propanone, and mixtures thereof.

8. A coating composition as defined in claim 1, wherein the at least one photoinitiator is a mixture of 1-hydroxy-cyclohexyl-phenyl-ketone and 2-methyl-1-[4-(methylthio)phenyl]-2-(4-morpholinyl)-1-propanone.

9. A coating composition as defined in claim 1, wherein the at least one solvent is selected from the group consisting of isopropanol, ethyl acetate, 1-methoxy 2-propanol, and mixtures thereof.

10. A coating composition as defined in claim 1, wherein the at least one solvent is a mixture of isopropanol, ethyl acetate, and 1-methoxy 2-propanol.

11. A coating composition as defined in claim 1, wherein the at least one inorganic acid is hydrochloric acid.

12. A coating composition as defined in claim 1, wherein the relative amounts of the constituents of the coating composition are controlled such that, when the composition is deposited onto the surface of an article and cured, to form a coating having a thickness in the range of 10 to 200 nm, the coating has a refractive index less than 1.55 at a wavelength of 510 nm.

13. A coating composition as defined in claim 1, wherein the relative amounts of the constituents of the coating composition are controlled such that, when the composition is deposited onto the surface of an article and cured, to form a coating having a thickness in the range of 10 to 200 nm, the coating has a refractive index less than 1.50 at a wavelength of 510 nm.

* * * * *